Figure 4:
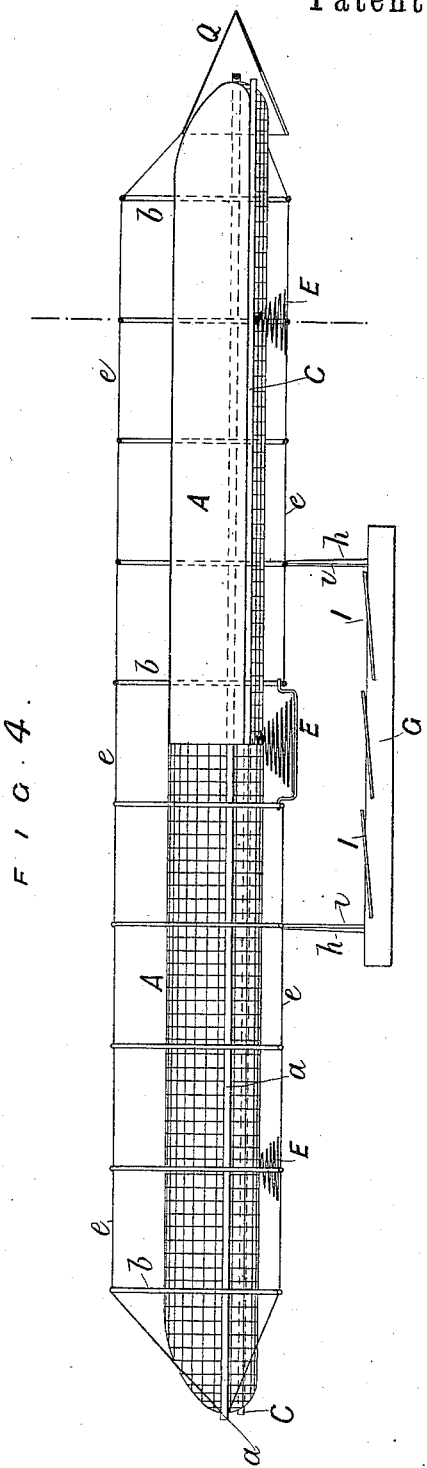

(No Model.) 3 Sheets—Sheet 1.
W. N. HUTCHINSON.
AERIAL VESSEL.
No. 371,759. Patented Oct. 18, 1887.
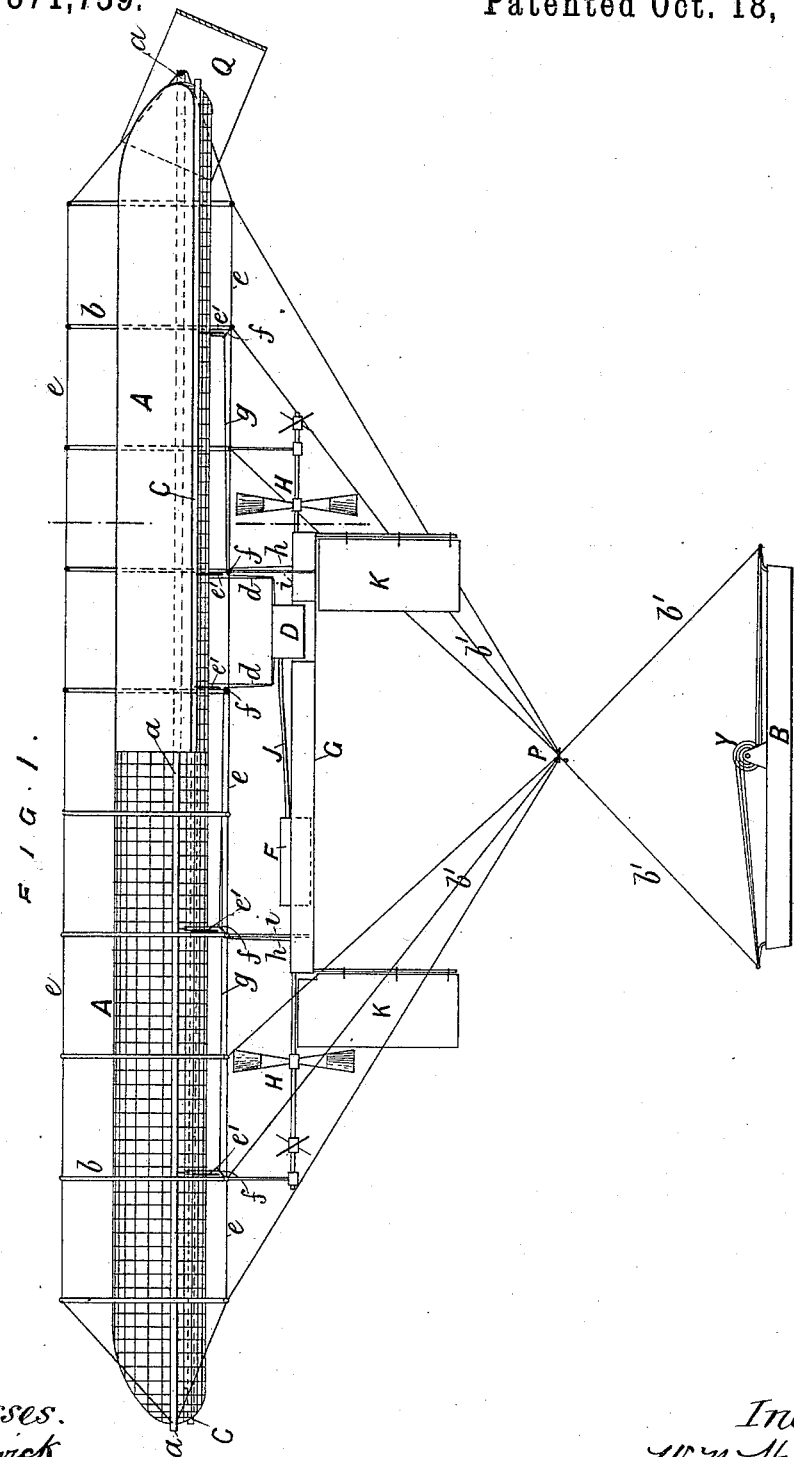

(No Model.) 3 Sheets—Sheet 2.
W. N. HUTCHINSON.
AERIAL VESSEL.
No. 371,759. Patented Oct. 18, 1887.
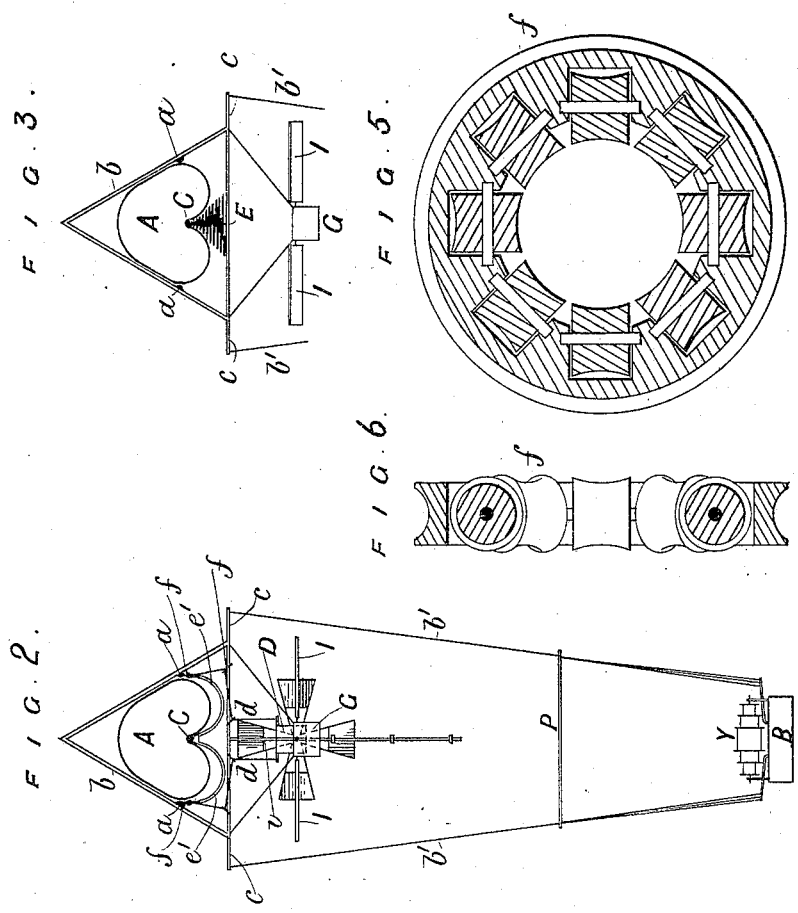

(No Model.) 3 Sheets—Sheet 3.

W. N. HUTCHINSON.
AERIAL VESSEL.

No. 371,759. Patented Oct. 18, 1887.

Witnesses.
C. Sedgwick
J. M. Ritter

Inventor:
W. N. Hutchinson
Munn & Co
Attorneys.

UNITED STATES PATENT OFFICE.

WILLIAM NELSON HUTCHINSON, OF WELLESBOURNE, BIDEFORD, COUNTY OF DEVON, ENGLAND.

AERIAL VESSEL.

SPECIFICATION forming part of Letters Patent No. 371,759, dated October 18, 1887.

Application filed May 26, 1887. Serial No. 239,424. (No model.)

*To all whom it may concern:*

Be it known that I, WILLIAM NELSON HUTCHINSON, at present residing at Wellesbourne, Bideford, in the county of Devon, England, general in Her Majesty's army, have invented new and useful Improvements in Aerial Vessels, of which the following is a full, clear, and exact description.

My invention relates to the construction of navigable balloons or aerial vessels, and particularly to means of keeping the skin or envelope constantly distended, notwithstanding the expansion or contraction of the contained gas, under variations of atmospheric temperature. It is necessary for the safety of such aerial vessels, particularly when destined to make long voyages, that a means should be provided for keeping the skin or envelope of the balloon, of whatever form it may be, constantly distended and free from plaits or folds, notwithstanding the contraction of the contained gases; otherwise, if allowed to fall into folds or wrinkles, there is danger of the dew or rain moistened skin or envelope becoming frozen in the collapsed form and of bursting by reason of the expansion of the gas on suddenly entering a warmer atmosphere before the ice-bound plaits have had time to thaw.

The accompanying drawings show how the constant distension of the skin can be maintained while permitting of variation in the capacity or volume of the envelope according to the expansion or contraction of the gases.

Figures 1 and 4, with transverse sections, Figs. 2 and 3, represent a navigable gas-tight balloon of elongated form, which, when fully inflated, will be of cylindrical form with elliptical or rounded ends. The drawings show one three hundred and sixty feet long by thirty feet diameter. The cylindrical is more simple in construction than the fish or cigar shape, for, the greatest area within the meshes of the confining-net that can with safety be given to the skin being calculated, the webbing can all be of one strength, whereas in the cigar shape the webbing would be increased in strength and weight proportionately to the increase in diameter of the balloon from the ends toward the middle.

The inflated envelope A is shown as about two-thirds full of gas and embraced by a close-fitting net laced to a bar, $a$, encircling the balloon at its mid-horizontal zone. To this bar, which is preferably made of bamboo, all ropes are attached. The envelope A is embraced by triangular bamboo frames $b$, which are securely fastened to the bar $a$. The extremities of the lower members of those near the bow and stern are extended beyond the side members, as at $c\ c$, Fig. 3, and through the extremities of these extended arms pass the suspension-ropes $b'$ of the cargo-car B to the bar $a$, to which they are attached, the object of thus splaying the ropes $b'$ being to cause them to act as stays to prevent lateral swinging motion of the car and insure its remaining centrally beneath the balloon when exposed to a strong side wind.

$e\ e\ e$ are thin wire guy-ropes connecting the triangular frames at each of their angles. The guy-ropes meet at and are fastened to the extremities of the aforesaid bar $a$. The balloon is thus inclosed in a strong cage, which shields it from all external injury, and which, while firm, has all the flexibility that is essential.

C is the compressor, whereby slack of the envelope A is taken up. It consists of a deep bar of wood or a steel tube a trifle longer than the length of the balloon lying in its mid-vertical plane, and is constantly pressed upward against the bottom of the inflated envelope of the balloon, so that there can never be any plaits. The less the breadth of the bar the less the force required to press it upward; but it must have such breadth that the gas can act upon it efficiently without causing much wear. The upward pressure of this bar may be obtained either by a weight, D, Fig. 1, or by springs E, as in Figs. 3 and 4. The weight D, giving a uniform upward pressure to the compressor-bar C, is furnished by the steam-boiler, which, as it does not directly act upon the shaft of the propeller, need not be rigidly fixed to the propelling-car, as is part F, which is the steam-engine, and which is connected with D by a flexible telescopic pipe, J. The weight D is borne by four main ropes, $d\ d$, Figs. 1 and 2, running over pulleys on the bar $a$ and attached to bent steel cross-rods $e'$, extending from side to side, as in Fig. 2, fixed transversely to the compressor-bar C, the ropes $d$ passing through anti-friction eyes $f$ on the triangular frames.

In order that all parts of the compressor may be acted on simultaneously, branch ropes $g$ $g$, Fig. 1, attached to similar cross-rods, $e'$ $e'$, fixed to the compressor-bar, are lashed to the main ropes. The rods are so bent in two curves that neither they nor the ropes will ever come in contact with the skin of the balloon. The steam-boiler D is carried by a frame-work movable up and down in a well in the propeller-car G. The construction of the anti-friction guide-rings $f$ is shown in Figs. 5 and 6, and is such that the rope will always run against a rotating sheave. In a fish or cigar shaped balloon the compressor-bar, instead of being straight, would conform to the curved outline of the balloon.

When springs E, Figs. 3 and 4, are used, they would be of a conical spiral form, and would have so many coils and be of such diameter at the base that it would not be necessary to call into use more than a fractional part of their capacity for extension. They are fixed between the base sides of the triangular frames and the compressor-bar C, which they thrust upward against the envelope of the balloon. The part of the envelope which is in contact with the compressor-bar C is protected from abrasion by extra thicknesses of the same material. Being, with its confining-net, constantly stretched, it rides symmetrically on the compressor-bar, to which it is laced, without shifting. The net being also laced, as described, to the bar $a$ is a further security against any shifting.

The propelling-car G cannot be too near the balloon, provided there is space for the blades of the propellers H to revolve. As large blades require strong heavy stays, it is thought best to obtain the same area of canvas by having several small blades with rapid rotation—say a couple of two-bladed propellers at the stern and a couple at the bow—the propellers at each end having an interval between them sufficient to prevent the action of one interfering with the other, the blades of the adjacent propellers being set at right angles to those of the other, as shown in Figs. 1 and 2. All the blades have a flange on the outer circumference to diminish the centrifugal motion of the air. The overhanging ends of the propeller-shafts are supported in bearings $h'$, suspended from the triangular frames, the frames being made stronger than the others to bear the extra strain resulting therefrom.

The propeller-car is suspended by ropes $h$, Figs. 1 and 2, attached to the bar $a$ and passing through guide-eyes fastened to the extremities of the base sides of the triangular frames. The car is kept at its proper distance from the balloon by vertical distance-posts of bamboo $i$, Fig. 1, near the bow and stern of the car, running to the center of the base sides of two of the triangular frames, as shown, thus almost rendering the car a fixture, yet detachable when required.

K K are vertical bow and stern rudders. They are simultaneously acted on and moved in opposite directions by continuous tiller-ropes crossing in the middle, arranged immediately under the car.

I I, &c., Fig. 4, are pairs of large light horizontally and centrally pivoted planes at either side of the propelling-car. They are adapted to be adjusted in a horizontal or inclined position by a suitable mechanical arrangement, whereby the aeronaut is enabled to give all of them a simultaneous upward or downward inclination, whereby the balloon is caused to travel in an upwardly or downwardly inclined direction, while always preserving its horizontal position. By this means, without loss of gas or ballast, should the breeze be too strongly adverse, a less unfavorable current may be sought for in a higher or lower altitude. As a deviation of those rudders from their usual horizontal position retards progress, the aeronauts, by acting upon ropes attached to the extremities of the cross-rods $e'$ $e'$ and passing through pulleys on side rods, $b$, have the power of aiding descents by diminishing the bulk of their balloon when inflated with coal-gas. With hydrogen it could be but little diminished. When spiral springs E are employed, the balloon's length, and therefore bulk, could be temporarily diminished by the aeronauts operating on ropes attached to broad bands fixed horizontally in the mid-plane of the bow and stern of the balloon.

The cargo car B is suspended from the parts of the bar $a$ near the two extremities of the balloon, the ropes $b'$ passing through guide-rings at the laterally-projecting extremities of the bottom members of the triangular frames, and also through anti-friction rings at the extremities of the bar P, (being ordinarily firmly held there by catches,) before being attached to the car. Thus any fore-and-aft shifting of the load in the car has not the least tendency to derange the horizontality of the balloon. It hangs in the center of buoyancy directly below the propelling-car at the distance considered most desirable. The aeronauts, on freeing the catches that hold the ropes to the bar P, by acting on a drum or windlass, Y, Figs. 1 and 2, of varying diameter to suit the length of each rope, can make the car rise or sink.

Q, Fig. 1, is a wedge-shaped shield hinged on $a$. It effectually prevents caving in of the end of the envelope, however great the speed. It is adjustable at various inclinations upward or downward by means of a cord and may serve to aid ascents and descents and be useful, when the balloon is at anchor, in a gale. In Fig. 4 the shield is conical, which form offers less resistance to progress. A slot at the bottom affords free passage to the compressor-bar.

Passengers and cargo are easily landed, even when it blows hard, inasmuch as by turning the horizontally-pivoted planes I nearly vertical and causing the propellers to revolve all the while at a rate dependent on the strength of the wind the two opposing forces would bring the balloon nearly to a standstill and keep it almost stationary.

Only three hundred and sixty feet have been named as a length for the balloon; but it seems likely that it will eventually be much exceeded, for size, besides increasing the capability for transport, diminishes the necessity for great nicety in calculating, when building, the least weight that could be given to each separate part, and unless navigable aerial vessels can undertake long voyges they would be of but little use. Therefore the ability to carry much fuel or other source of power is indispensable, and it is consequently a satisfactory reflection that as the size of balloons increases the evil resulting from the increased surface opposed to progress is counterbalanced by a twice as great increase in the buoyancy, resulting from this greater size, for, if one balloon have twice the diameter and length of another of similar form, the surfaces opposed to progress will be as four to one, while the buoyancy will be as eight to one; hence, if half the carrying power of the smaller be expended in floating its steam-engine, only one-fourth of the carrying power of the larger will be expended in floating a steam-engine of four times the weight of the other and developing at the least four times the horse-power.

Having now particularly described and ascertained the nature of the said invention and in what manner the same is to be performed, I declare that what I claim is—

The combination, with the skin or envelope of a balloon or navigable aerial vessel, of a compressor acted on by weight or spring power, substantially as described, and thereby caused to press against the inflated balloon with an approximately constant pressure, whereby the skin or envelope of the balloon is kept distended and free from plaits.

The foregoing specification of my improvements in aerial vessels signed by me this 7th day of May, 1887.

WILLIAM NELSON HUTCHINSON.

Witnesses:
 THOMAS OERTON,
Solicitor, 8 Lansdowne Terrace, Bideford, Devon.
 JOHN LYLE GIDDY,
 20 Bridgeland Street, Bideford, Accountant.